(12) United States Patent
Bank et al.

(10) Patent No.: US 8,392,973 B2
(45) Date of Patent: Mar. 5, 2013

(54) AUTONOMOUS INTELLIGENT USER IDENTITY MANAGER WITH CONTEXT RECOGNITION CAPABILITIES

(75) Inventors: Judith H. Bank, Durham, NC (US); Dimple Bhatia, San Jose, CA (US); Lisa M. Bradley, Durham, NC (US); Dana L. Price, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 12/473,754

(22) Filed: May 28, 2009

(65) Prior Publication Data
US 2010/0306833 A1    Dec. 2, 2010

(51) Int. Cl.
*G06F 17/00* (2006.01)
*G06F 7/04* (2006.01)

(52) U.S. Cl. ............. 726/5; 726/1; 726/2; 726/3; 726/4; 726/17; 726/21

(58) Field of Classification Search ................. 726/2, 4, 726/5, 17, 21
See application file for complete search history.

(56) References Cited

U.S. PATENT DOCUMENTS

| | | | | |
|---|---|---|---|---|
| 5,414,852 A * | 5/1995 | Kramer et al. | ................ | 718/104 |
| 2002/0124015 A1* | 9/2002 | Cardno et al. | ................ | 707/204 |
| 2003/0188201 A1* | 10/2003 | Venkataramappa | .......... | 713/202 |
| 2005/0015490 A1* | 1/2005 | Saare et al. | ................... | 709/225 |
| 2008/0243791 A1* | 10/2008 | Suzuki et al. | .................... | 707/3 |

* cited by examiner

*Primary Examiner* — Peter Shaw
(74) *Attorney, Agent, or Firm* — Patents on Demand P.A.; Brian K. Buchheit; Scott M. Garrett (57) ABSTRACT

A remotely located, uniquely identified resource can serve an application utilized by the Web browser. Access to the application can require authentication including a userid and password. A memory for a record associated with the application can be queried. The memory can include a set of userids and passwords indexed against unique application identifiers that are independent upon server identifiers or URLs. Responsive to querying the memory, a match between the application requiring authentication and a unique application identifier in the memory can be determined. A userid and password can be provided without manual input from a user from memory that is associated with the unique application identifier to the remotely located. The uniquely identified resource can use the userid/password as authentication to access the served application.

15 Claims, 3 Drawing Sheets

Sample Login Web Page Code   300

```
<html>
  <head>
    <title>My Web App Login </title>
    <meta name="generator" content="Websphere Studio">
  </head>
  <body id="center">
    <form name="loginForm" method="post" action="validate">
      User ID:
      <input type="text" name="userID" size="30">
      Password:
      <input type="password" name="pswd" size="30">
    </form>
  </body>
</html>
```

HTML Tags 305

Sample Application Identification Record   350

| Identifying Characteristics   355 | User Identity Reference 360 |
|---|---|
| <title>My Web App Login </title> | |
| <form name="loginForm" method="post" action="validate"> | 000021 |
| User ID:<br><input type="text" name="userID" size="30"> | |

FIG. 3

AUTONOMOUS INTELLIGENT USER IDENTITY MANAGER WITH CONTEXT RECOGNITION CAPABILITIES

BACKGROUND

The present invention relates to the field of user identification data management and, more particularly, to an autonomous intelligent user identity manager with context recognition capabilities.

The use of various forms of user identification data to validate user access to computing systems is commonplace. Between work-related systems and the plethora of Web sites available via the Internet, users often have multiple combinations of user identification data, and remembering the combinations and their associated applications has become a growing problem.

A variety of approaches have been developed to address the management of user identification data. Examples of current approaches include browser caching, cookies, password wallets, and single-sign-on solutions. Each has unique advantages and disadvantages over the others. For example, browser caching occurs when a browser saves userid/password combinations a first time this information is entered for a given Uniform Resource Locator (URL). Subsequent visits to that URL result in the saved information being used. Browser caching solutions have a limitation in that a userid/password combination will never be automatically entered for a URL identified resource that has never before been visited. Additionally, this solution is client centric so that when a user utilizes multiple different computers, userid/password information stored on one computer must be re-entered for a different computer.

Password wallets establish a cache able to hold a set of userid/password combinations. When a new userid/password combination is needed, a Web browser can access the cache and select a combination. Thus, password wallets can provide a userid/password even when a URL is being visited for a first time. A limitation of password wallets is that a userid/password combination must be manually selected from the password wallet each time a password is required.

Single-sign-on solutions (e.g., OpenID, BLUEID, etc.) allow for an identity to be created, where that identity can be used when logging into URLs that support that identity standard. In such a solution, a userid/password combination must still be manually entered, even though the entered userid/password combination can be the same across all URLs/servers that support that standard of the single-sign-on solution.

Another solution is based on a URL or domain/federation membership that can be pre-configured and then automatically entered when a URL is visited. This is how IBM TIVOLI FEDERATED IDENTITY MANAGER (TFIM) and other similar products function. These solutions have limitations including: pre-configuration can be a complex, yet required process; separate identity management application(s) with associated name servers and/or LDAP servers may be required; and the like.

While all of the above approaches are helpful in many situations, none of them can handle situations where the location (e.g., URL or server) of a software application requiring a userid/password is subject to change. For example, a server farm is often used to provide high-availability Web services or applications. Each time a user accesses an application, the application may be provided by a different server of the server farm. Each server is uniquely identified within the server farm by a different identifier (e.g., URL). The differences in servers result in a user being prompted to enter userid/password information, which has previously been entered for that same application, when a different server was utilized. From an end user perspective, they are being asked to re-enter their userid/password for that application, which can be confusing and frustrating to a user, and which can also induce unnecessary concerns that an illegitimate site (e.g., a phishing site) is attempting to acquire their userid/password for non-legitimate purposes.

BRIEF SUMMARY

The disclosure teaches a lightweight solution able to be utilized to automatically provide a userid/password combination for a served application. In one embodiment, a Web browser, Web browser plug-in, or Web browser extension can store userid/password combinations for software applications, which are provided as needed. Unlike traditional browser caching, the stored and utilized userid/passwords are indexed against a software application, as opposed to a URL or unique server identifier. Thus, for a given application, even when a server or URL changes over time, userid/passwords can be automatically provided, which is not possible for conventional browser caching or other password management solutions. In one embodiment of the disclosure, a userid/password combination can be automatically entered for a user without user interaction, thus not requiring manual selection (which is needed for conventional password wallet solutions). The disclosure is lightweight as it does not require use of separate identity management applications, name servers, LDAP servers, and the like, which is a common requirement of conventional single-sign-on solutions. Additionally, the disclosed solution does not require complex pre-registration to occur nor must it handle related overhead common for pre-registration solutions. The disclosed solution is not to be construed as limited in application to Web browsers and can apply to other context, such as voice browsers. Further, the disclosed solution, although able to be implemented on a client, can also be implemented by a Web server or network element, such as a network element providing a password management Web service.

One aspect of the disclosure can include an authentication method that accesses a remotely located, uniquely identified resource from a Web browser implemented in a computer program product running on hardware. The resource can serve an application utilized by the Web browser. Access to the application can require authentication comprising a userid and password. A memory for a record associated with the application can be queried. The memory can be a physical memory including digitally encoded content including a set of userids and passwords indexed against unique application identifiers that are independent upon server identifiers or URLs of network resources that serve the unique applications. Responsive to querying the memory, a match between the application-requiring authentication and a unique application identifier in the memory can be determined. A userid and password can be provided without manual input from a user from memory that is associated with the unique application identifier to the remotely located. The uniquely identified resource can use the userid/password as authentication to access the served application.

Another aspect of the disclosure can include a method for intelligently managing user identities. An intelligent user identity manager can detect an authentication request sent from a software application operating from an application server to a software application client interface. The authentication request can require the submission of one or more items of user identification data. The authentication request can be automatically intercepted prior to handling by the software application client interface. The authentication request can be analyzed for identifying characteristics of the software application. The existence of matches for the one or more identifying characteristics of the software application can be determined from application identification records. The matches can be an exact match or a partial match. When matches exist, a user identity record can be selected from a set of user identity records that correspond to the matches. The set of user identity records that correspond to the matches can be a subset of a larger set of user identity records. Each user identity record can be a unique composition of user identification data. The selected user identity record can be determined as most likely to satisfy the authentication request. The user identity record of an exact match can be given priority over the user identity record of a partial match. The selected user identity record can then be conveyed to the software application as a response to the authentication request on behalf of a human user.

DETAILED DESCRIPTION

The present invention discloses a solution that intelligently manages user identities. An intelligent user identity manager can capture the identifying characteristics of visited software applications as application identification records, and relate the application identification records to a stored user identity record. When the intelligent user identity manager detects an authentication request, the intelligent user identity manager can compare the identifying characteristics of the requesting software application with respect to the application identification records. The user identity record corresponding to a match, either exact or partial, in the application identification records can be supplied to the software application. In the case where no match exists, the intelligent user identity manager can pass the authentication request to the waiting client interface of the software application, where a user can manually enter the necessary information.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
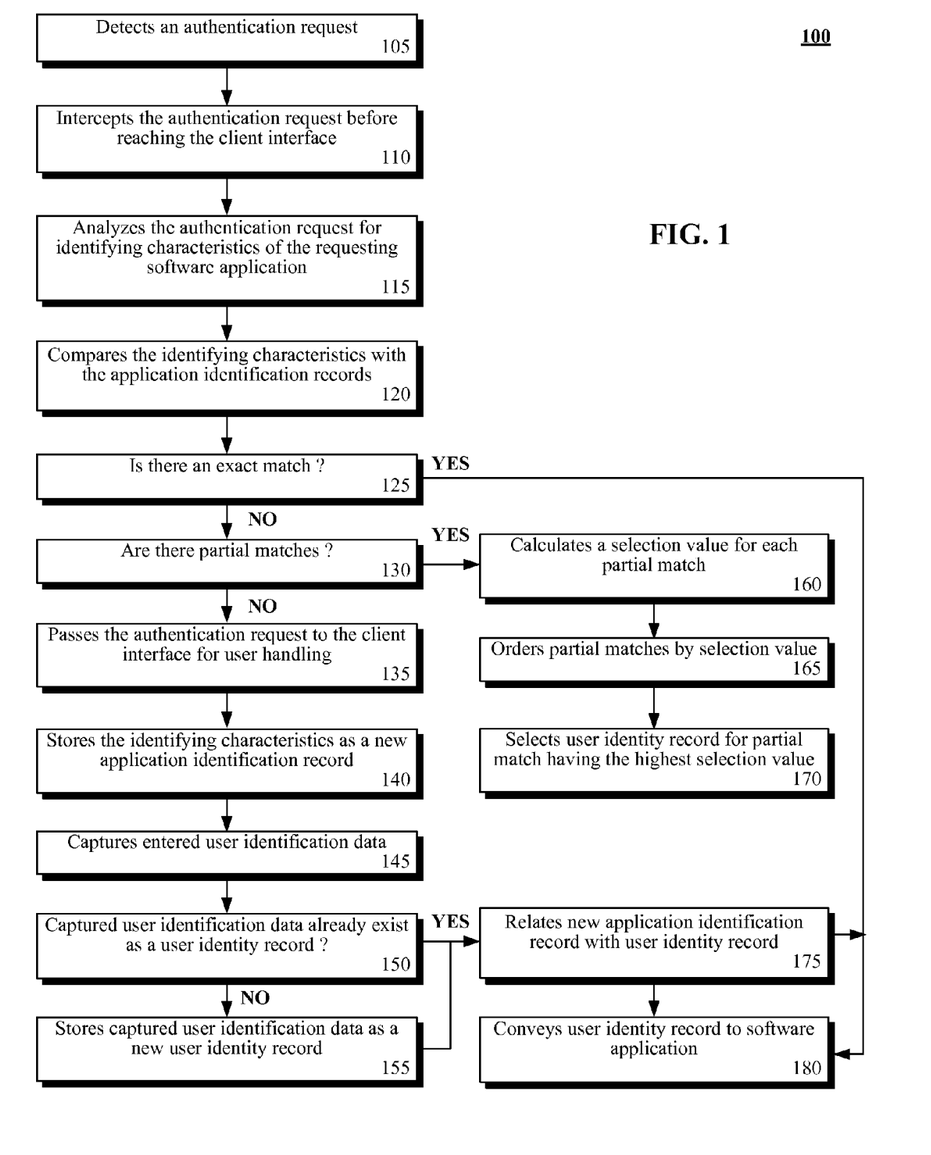
FIG. 1 is a flow chart of a method that describes the intelligent management of user identities as performed by an intelligent user identity manager in accordance with embodiments of the inventive arrangements disclosed herein.

FIG. 1 is a flow chart of a method 100 that describes the intelligent management of user identities as performed by an intelligent user identity manager in accordance with an embodiment of the inventive arrangements disclosed herein. Unlike conventional approaches that automatically supply user identification data to a software application that exactly matches a known and previously-accessed software application, an intelligent user identity manager can also attempt to supply an unknown and/or unvisited software application with a user identity record determined to be a likely match based upon the identifying characteristics of known software applications.

Method 100 can begin with step 105 where the intelligent user identity manager can detect an incoming authentication request from a software application. The authentication request can be intercepted prior to reaching the client interface for the software application in step 110.

In step 115, the authentication request can be analyzed for identifying characteristics of the requesting software application. Depending on the type of software application being accessed the identifying characteristics can also be extracted from data associated with the software application. Examples of identifying characteristics can include, but are not limited to, an application name, a version number, a service pack number, an Internet protocol (IP) address, a server name, a process identifier, a markup language tag attribute, a markup language tag attribute value, HTML header information of a page of the application, HTML title page information for the application, HTML divisions for at least one page of the application, style sheet usage identifiers of at least one page of the application, text strings within a page of the application, and the like. In one embodiment, multiple different identifying characteristics can be utilized to accurately identity an application.

The identifying characteristics can be compared to application identification records in step 120. Application identification records can represent the identifying characteristics collected from software applications previously accessed. An application identification record can include an association to a user identity record that satisfies the authentication request for the software application.

In step 125, it can be determined if there is an exact match for the identifying characteristics of the software application in the application identification records. When an exact match exists, flow can proceed to step 180 where the associated user identity record can be conveyed to the software application.

When an exact match does not exist, it can be determined if partial matches exist for the identifying characteristics of the software application in the application identification records in step 130. When one or more partial matches exist, flow can proceed to step 160 where a selection value can be calculated for each partial match. The selection value can quantify the degree to which a partial match satisfies the identifying characteristics of the requesting software application.

In step 165, the partial matches can be ordered by selection value. The user identity record for the partial match having the highest selection value can be selected in step 170. From step 170, flow can proceed to step 180 where the associated user identity record can be conveyed to the software application.

When one or more partial matches do not exist, it can be assumed that the requesting software application is unknown and/or has not been previously accessed. Step 135 can then execute where the intelligent user identity manager passes the authentication request to the client interface for user handling. The identifying characteristics of the software application can be stored as a new application identification record in step 140.

When the user handles the authentication request, step 145 can execute where the intelligent user identity manager can captured the entered user identification data. It can be determined if the captured user identification data already exists as a user identity record in step 150.

When the captured user identification data does not already exist, step 155 can execute where the captured user identification data can be stored as a new user identity record. When the user identification data already exists or after it was stored as a new user identity record, the user identity record can be related to the new application identification record in step 175. In step 180, the associated user identity record can be conveyed to the requesting software application.

In one embodiment, the identifying characteristics can be used as a secondary type of match for userid/password purposes, after a match has been attempted based upon a URL or server identifier. That is, the method steps 115-180 can selectively occur only after a standard Web browser caching attempt is make, which fails. Thus, in one configuration, the method 100 can represent an enhancement to conventional browsing caching techniques, which enables caches based upon application specific characteristics. In other embodiments, the method 100 can be implemented independent of or as a substitute for conventional browser caching.

Figure 2:
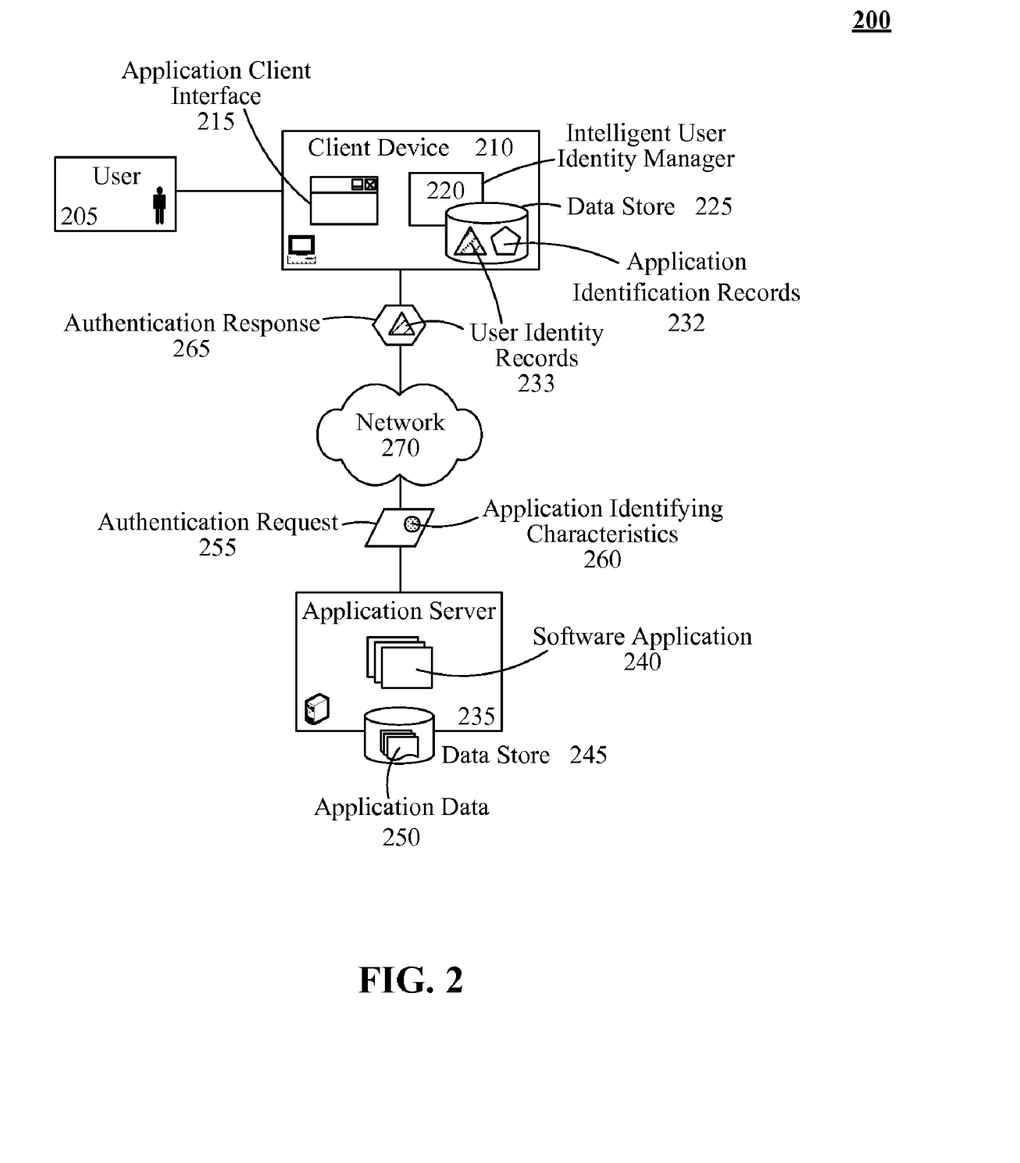
FIG. 2 is a schematic diagram illustrating a system that utilizes an intelligent user identity manager in accordance with an embodiment of the inventive arrangements disclosed herein.

FIG. 2 is a schematic diagram illustrating a system 200 that utilizes an intelligent user identity manager 220 in accordance with embodiments of the inventive arrangements disclosed herein. The intelligent user identity manager 220 of system 200 can perform method 100 of FIG. 1.

In system 200, the user 205 can utilize an application client interface 215 running on a client device 210 to access the software application 240 and/or related application data 250 from an application server 235. The client device 210 can represent a variety of computing devices capable of running the software application client interface 215 and the intelligent user identity manager 220.

Access to the software application 240 and/or application data 250 can require valid user identification data from the user 205. The application server 235 can be a computing device configured to provide access to the software application 240 and/or application data 250 contained in an accessible data store 245.

The application client interface 215 can be a software program configured to act as an interaction mechanism for the software application 240 over the network 270. The application client interface 215 can be a specialized interface specific to the software application 240, as in a client-server computing system, or a generic interface capable of interacting with multiple software applications 240, such as a Web browser.

The intelligent user identity manager 220 can be a software program configured to operate from a client device 210 to autonomously and automatically supply a software application 240 with a user identity record 233 to satisfy the authentication request 255 on behalf of the user 205 and with minimal interaction on the part of the user 205. To accomplish this task, the intelligent user identity manager 220 can utilize the user identity records 233 and application identification records 232 contained in an accessible data store 225.

In an alternate embodiment, the data store 225 can be a component of the client device 210 and/or remotely located from the client device 210.

The user identity records 233 can represent related groups of user identification data such as usernames and corresponding passwords. The application identification records 232 can contain groups of related information, such as identifying characteristics 260, representative of software applications 240 previously accessed by the user 205 from the client device 210.

When the user 205 uses the application client interface 215 to connect to the software application 240, the software application 240 can send an authentication request 255 requesting user identification data for validation. The authentication request 255 can include one or more identifying characteristics 260 of the requesting software application 240. Depending on the type of software application 240, the application data 250 presented within the application client interface 215, such as the source code for a Web page, can also be examined for identifying characteristics 260. Examples of identifying characteristics can include, but are not limited to, an application name, a version number, a service pack number, an Internet protocol (IP) address, a server name, a process identifier, a markup language tag attribute, and a markup language tag attribute value.

The intelligent user identity manager 220 can intercept the authentication request 255 before the authentication request 255 is handled by the application client interface 215. The identifying characteristics 260 of the requesting software application 240 can be compared with the application identification records 232. Any matches for the identifying characteristics 260 can be evaluated to determine which will mostly satisfy the authentication request 255.

Matches to the identifying characteristics 260 found in the application identification records 232 can be exact or partial in nature. That is, the intelligent user identity manager 220 can attempt to determine if the requesting software application 240 had been previously accessed by the user 205 but provided by a different application server 235, as in the situation where the application server 235 is one of many in a server farm environment.

It is imperative to emphasize that conventional user identity management approaches do not adequately handle such situations. Conventional user identity management approaches would handle this situation as an attempt to access a new software application 240, requiring the user 205 to enter user identification data that is already accessible by the conventional user identity management approach. The intelligent user identity manager 220 can minimize the frequency in which the user 205 is required to enter user identification data.

The intelligent user identity manager 220 can then retrieve the user identity record 233 that corresponds to the user identity record 233 and send the retrieved user identity record 233 to the software application 240 in an authentication response 265. The software application 240 can then use the user identity record 233 to validate the access permissions of the user 205.

Should the user identity record 233 sent to the software application 240 fail validation, the intelligent user identity manager 220 can send the user identity record 233 of the next match until either the list of matches is exhausted or a user identity record 233 validates.

In the event that the list of matches is exhausted before a valid user identity record 233 is found, the intelligent user identity manager 220 can conclude that the requesting software application 240 is unknown and/or has not been previously accessed by the user 205, and can pass the authentication request 255 to the application client interface 215. The intelligent user identity manager 220 can then capture and store the identifying characteristics 260 as a new application identification record 232. The user identification data entered by the user 205 can be captured and, when not already present as an existing user identity record 233, stored as a new user identity record 233. The new application identification record 232 can then be associated with the corresponding user identity record 233.

In another contemplated embodiment, the intelligent user identity manager 220 can include a heuristic algorithm (not shown) configured to learn from the failed authentications of user identity records 233.

In yet another embodiment, system 200 can include a security component (not shown) that can apply security policies to the functionality of the intelligent user identity manager 220. The security component can be an integrated component of the intelligent user identity manager 220 or operate external to the intelligent user identity manager 220. The security component can ensure that the intelligent user identity manager 220 does not provide user identification data to false and/or comprised sources, as in the case of Web site spoofing.

Network 270 can include any hardware/software/and firmware necessary to convey data encoded within carrier waves. Data can be contained within analog or digital signals and conveyed though data or voice channels. Network 270 can include local components and data pathways necessary for communications to be exchanged among computing device components and between integrated device components and peripheral devices. Network 270 can also include network equipment, such as routers, data lines, hubs, and intermediary servers which together form a data network, such as the Internet. Network 270 can also include circuit-based communication components and mobile communication components, such as telephony switches, modems, cellular communication towers, and the like. Network 270 can include line based and/or wireless communication pathways.

As used herein, presented data stores 225 and 245 can be a physical or virtual storage space configured to store digital information. Data stores 225 and 245 can be physically implemented within any type of hardware including, but not limited to, a magnetic disk, an optical disk, a semiconductor memory, a digitally encoded plastic memory, a holographic memory, or any other recording medium. Data stores 225 and 245 can be a stand-alone storage unit as well as a storage unit formed from a plurality of physical devices. Additionally, information can be stored within data stores 225 and 245 in a variety of manners. For example, information can be stored within a database structure or can be stored within one or more files of a file storage system, where each file may or may not be indexed for information searching purposes. Further, data stores 225 and/or 245 can utilize one or more encryption mechanisms to protect stored information from unauthorized access.

Each client device or server 235 can comprise a set of one or more hardware devices, each of which optionally containing software (e.g., an operating system, BIOS, software/firmware computer program products, etc) that the hardware is able to execute to perform computing operations. The hardware can include one or more central processing unit, a volatile memory, and a nonvolatile memory, and a network adaptor (for connecting the hardware to network 170) interconnected via a bus. Each of the device 210 and server 235 can be implemented as a standalone machine or as a set of two or more machines operating in a distributed computing space as a single computing device. Further, a software application 240 can be an application comprising multiple different components, each of which may be executed upon different servers (e.g., server 245). For example, software application 240 can be a SOA based application comprising one or more services.

In system 200, manager 225 can be implemented to interoperate with Web browser code. For example, manager 225 can be implemented as a Web browser plug-in, a Web browser extension, and/or native code of a Web browser. In one embodiment, manager 225 can be a component of a browser cache application, which performs URL based caching and uses manager 225 capabilities only when no match based upon conventional browser caching techniques is found. Contemplated embodiments exist where functionality of the manager 220 is implemented remotely from device 210. For example, manager 220 functionality can be implemented by a network element (not shown) connected to network 270 as a password management service.

Figure 3:
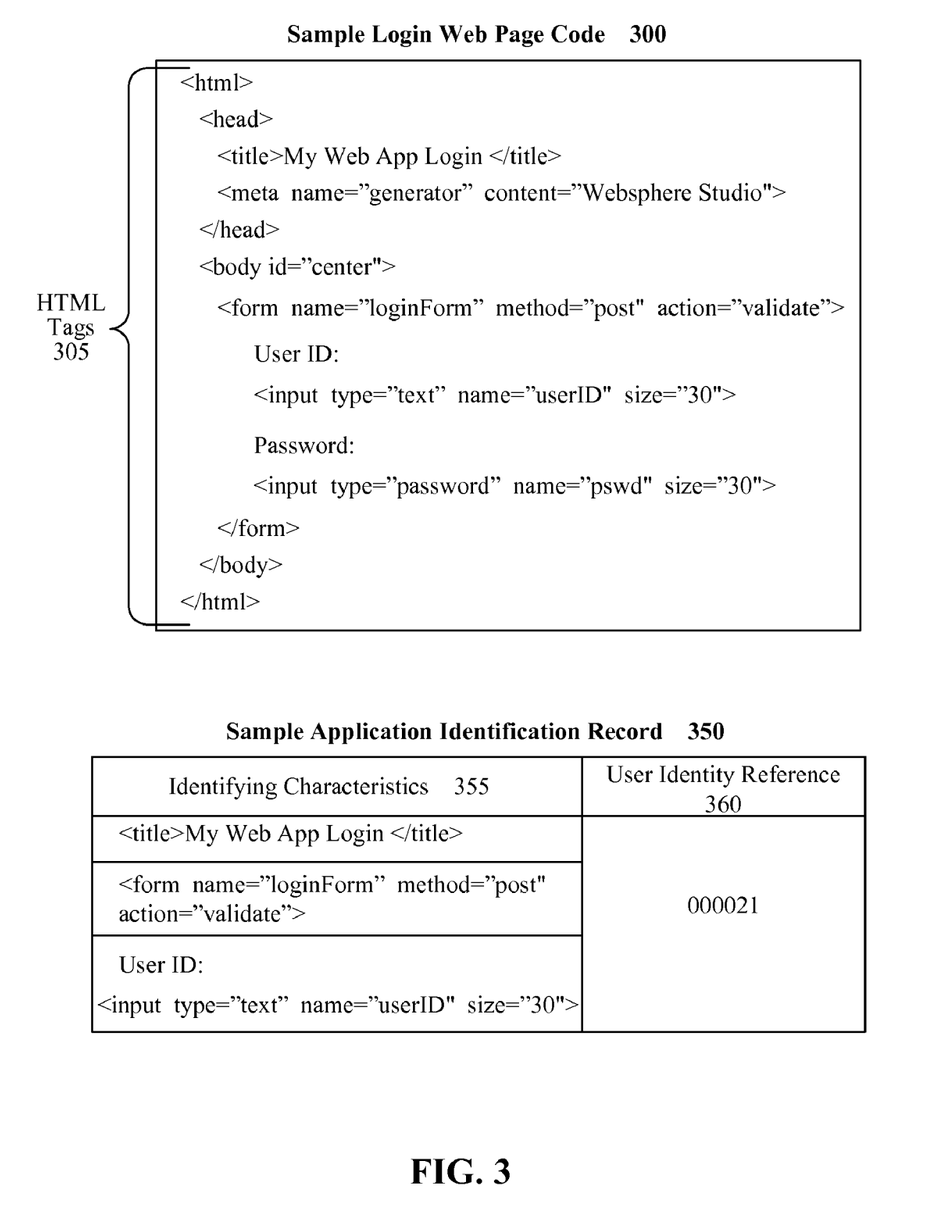
FIG. 3 illustrates sample login Web page code and a corresponding sample application identification record that can be captured by an intelligent user identity manager in accordance with embodiments of the inventive arrangements disclosed herein.

FIG. 3 illustrates sample login Web page code 300 and a corresponding sample application identification record 350 that can be captured by an intelligent user identity manager in accordance with embodiments of the inventive arrangements disclosed herein. The sample login Web page code 300 and corresponding sample application identification record 350 can be utilized within the context of system 200 and/or in conjunction with method 100.

It should be noted that the contents of the sample login Web page code 300 and sample application identification record 350 are for illustrative purposes only and are not meant as a comprehensive or limiting embodiment.

As shown in this example, the sample login Web page code 300 can contain the HyperText Markup Language (HTML) tags 305 for a very simple Web page that presents a user with a form in which a username and password can be entered.

The sample application identification record 350 can represent the identifying characteristics 355 extracted from the sample login Web page code 300 by the intelligent user identity manager to describe the underlying Web application being accessed. In this example, the identifying characteristics 355 extracted from the sample login Web page code 300 include the title tag, the form tag, and the text string "User ID:" coupled with the corresponding input tag.

All of these identifying characteristics 355 can represent a single sample application identification record 350 that describes this specific Web application. This sample application identification record 350 can have a user identity reference 360 associated with it. The user identity reference 360 can represent the sample application identification record's 350 association with a specific user identity record.

As shown in this example, the user identity reference 360 is a numeric value or code, such as a database record identifier. In an alternate embodiment, the entirety or a portion of the contents of the user identity record can be stored with the sample application identification record 350.

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for autonomous intelligent user identity management comprising:
   detecting of an authentication request from a software application operating from an application server to a software application client interface by an intelligent user identity manager, wherein the authentication request requires submission of at least one item of user identification data for the application;
   automatically intercepting the authentication request prior to handling by the software application client interface;
   analyzing the authentication request for at least one identifying characteristic of the software application, wherein said at least one identifying characteristic represents identification data associated with the software application;
   determining an existence of a plurality of partial matches and zero exact matches for the at least one identifying characteristic of the software application from within a plurality of application identification records;
   calculating a selection value for each of the plurality of partial matches, wherein said selection value quantifies a degree to which an application identification record corresponding to the partial match satisfies the at least one identifying characteristic of the software application;
   ranking the plurality of partial matches based on the calculated selection value;
   selecting a user identity record according to ranking based on the calculated selection value;
   conveying the selected user identity record to the software application as a response to the authentication request on behalf of a human user, when the selected user identity record fails to authenticate access to the software application, the conveying of the selected user identity record is repeated for each remaining user identity record corresponding to the plurality of partial matches, wherein said remaining user identity records are utilized according to the ranking, and, wherein said repetition of the conveying of the selected user identity record occurs until satisfaction of at least one of: exhaustion of the remaining user identity records and acceptance of the selected user identity record.

2. The method of claim 1, further comprising: when the at least one match is non-existent, storing the at least one identifying characteristic of the software application as a new application identification record within the plurality of application identification records;
   passing the intercepted authentication request to the software application client interface, wherein manual entry of user identification data is required;
   capturing the manually-entered user identification data;
   ascertaining an existence of the captured user identification data as an existing user identity record within the plurality of user identity records; and
   when the existing user identity record exists for the captured user identification data, recording an association between the new application identification record and the user identity record.

3. The method of claim 2, further comprising: when the existing user identity record is non-existent for the captured user identification data, storing the captured user identification data as a new user identity record within the plurality of user identity records.

4. The method of claim 2, wherein the manually-entered user identification data is extracted by the intelligent user identity manager from a response message generated by the software application client interface prior to transmission to the software application.

5. The method of claim 1, wherein the determination of the at least one match and the selection of the user identity record are performed utilizing a heuristic algorithm, further comprising:
   monitoring a result of the conveyance of the selected user identity record, wherein said result comprises at least one of an acceptance and a rejection; and
   adjusting the heuristic algorithm based upon said result.

6. A computer program product comprising:
   one or more computer-readable, non-transitory storage devices;
   program instructions, stored on at least one of the one or more storage devices, to detect of an authentication request from a software application operating from an application server to a software application client interface by an intelligent user identity manager, wherein the authentication request requires submission of at least one item of user identification data for the application;
   program instructions, stored on at least one of the one or more storage devices, to automatically intercept the authentication request prior to handling by the software application client interface;
   program instructions, stored on at least one of the one or more storage devices, to analyze the authentication request for at least one identifying characteristic of the software application, wherein said at least one identifying characteristic represents identification data associated with the software application;
   program instructions, stored on at least one of the one or more storage devices, to determine an existence of a plurality of partial matches and zero exact matches for the at least one identifying characteristic of the software application from within a plurality of application identification records;
   program instructions, stored on at least one of the one or more storage devices, to calculate a selection value for each of the plurality of partial matches, wherein said selection value quantifies a degree to which an application identification record corresponding to the partial match satisfies the at least one identifying characteristic of the software application;
   program instructions, stored on at least one of the one or more storage devices, to rank the plurality of partial matches based on the calculated selection value;
   program instructions, stored on at least one of the one or more storage devices, to select a user identity record according to ranking based on the calculated selection value; and
   program instructions, stored on at least one of the one or more storage devices, to convey the selected user identity record to the software application as a response to the authentication request on behalf of a human user, when the selected user identity record fails to authenticate access to the software application, the conveying of the selected user identity record is repeated for each remaining user identity record corresponding to the plurality of partial matches, wherein said remaining user identity records are utilized according to the ranking, and, wherein said repetition of the conveying of the selected user identity record occurs until satisfaction of at least one of: exhaustion of the remaining user identity records and acceptance of the selected user identity record.

7. The computer program product of claim 6, further comprising:
program instructions, stored on at least one of the one or more storage devices, to, when the at least one match is non-existent, store the at least one identifying characteristic of the software application as a new application identification record within the plurality of application identification records;
program instructions, stored on at least one of the one or more storage devices, to pass the intercepted authentication request to the software application client interface, wherein manual entry of user identification data is required;
program instructions, stored on at least one of the one or more storage devices, to capture the manually-entered user identification data; ascertaining an existence of the captured user identification data as an existing user identity record within the plurality of user identity records; and
program instructions, stored on at least one of the one or more storage devices, to, when the existing user identity record exists for the captured user identification data, record an association between the new application identification record and the user identity record.

8. The computer program product of claim 7, further comprising:
program instructions, stored on at least one of the one or more storage devices, to, when the existing user identity record is non-existent for the captured user identification data, store the captured user identification data as a new user identity record within the plurality of user identity records.

9. The computer program product of claim 7, wherein the manually-entered user identification data is extracted by the intelligent user identity manager from a response message generated by the software application client interface prior to transmission to the software application.

10. The computer program product of claim 6, wherein the determination of the at least one match and the selection of the user identity record are performed by program instructions utilizing a heuristic algorithm, further comprising:
program instructions, stored on at least one of the one or more storage devices, to monitor a result of the conveyance of the selected user identity record, wherein said result comprises at least one of an acceptance and a rejection; and
program instructions, stored on at least one of the one or more storage devices, to adjust the heuristic algorithm based upon said result.

11. A computer system comprising:
one or more processors and one or more computer-readable, tangible storage devices;
program instructions, stored on at least one of the one or more storage devices for execution by at least one of the one or more processors, to detect of an authentication request from a software application operating from an application server to a software application client interface by an intelligent user identity manager, wherein the authentication request requires submission of at least one item of user identification data for the application;
program instructions, stored on at least one of the one or more storage devices for execution by at least one of the one or more processors, to automatically intercept the authentication request prior to handling by the software application client interface;
program instructions, stored on at least one of the one or more storage devices for execution by at least one of the one or more processors, to analyze the authentication request for at least one identifying characteristic of the software application, wherein said at least one identifying characteristic represents identification data associated with the software application;
program instructions, stored on at least one of the one or more storage devices for execution by at least one of the one or more processors, to determine an existence of a plurality of partial matches and zero exact matches for the at least one identifying characteristic of the software application from within a plurality of application identification records;
program instructions, stored on at least one of the one or more storage devices for execution by at least one of the one or more processors, to calculate a selection value for each of the plurality of partial matches, wherein said selection value quantifies a degree to which an application identification record corresponding to the partial match satisfies the at least one identifying characteristic of the software application;
program instructions, stored on at least one of the one or more storage devices for execution by at least one of the one or more processors, to rank the plurality of partial matches based on the calculated selection value;
program instructions, stored on at least one of the one or more storage devices for execution by at least one of the one or more processors, to select a user identity record according to ranking based on the calculated selection value; and
program instructions, stored on at least one of the one or more storage devices for execution by at least one of the one or more processors, to convey the selected user identity record to the software application as a response to the authentication request on behalf of a human user, when the selected user identity record fails to authenticate access to the software application, the conveying of the selected user identity record is repeated for each remaining user identity record corresponding to the plurality of partial matches, wherein said remaining user identity records are utilized according to the ranking, and, wherein said repetition of the conveying of the selected user identity record occurs until satisfaction of at least one of: exhaustion of the remaining user identity records and acceptance of the selected user identity record.

12. The computer system of claim 11, further comprising:
program instructions, stored on at least one of the one or more storage devices for execution by at least one of the one or more processors, to when the at least one match is non-existent, store the at least one identifying characteristic of the software application as a new application identification record within the plurality of application identification records;
program instructions, stored on at least one of the one or more storage devices for execution by at least one of the one or more processors, to pass the intercepted authentication request to the software application client interface, wherein manual entry of user identification data is required;
program instructions, stored on at least one of the one or more storage devices for execution by at least one of the one or more processors, to capture the manually-entered user identification data; ascertaining an existence of the captured user identification data as an existing user identity record within the plurality of user identity records; and program instructions, stored on at least one of the one or more storage devices for execution by at least one of the one or more processors, to, when the existing user identity record exists for the captured user identification data, record an association between the new application identification record and the user identity record.

13. The computer system of claim 12, further comprising:

program instructions, stored on at least one of the one or more storage devices for execution by at least one of the one or more processors, to, when the existing user identity record is non-existent for the captured user identification data, store the captured user identification data as a new user identity record within the plurality of user identity records.

14. The computer system of claim 12, wherein the manually-entered user identification data is extracted by the intelligent user identity manager from a response message generated by the software application client interface prior to transmission to the software application.

15. The computer system of claim 11, wherein the determination of the at least one match and the selection of the user identity record are performed by program instructions utilizing a heuristic algorithm, further comprising:

program instructions, stored on at least one of the one or more storage devices for execution by at least one of the one or more processors, to monitor a result of the conveyance of the selected user identity record, wherein said result comprises at least one of an acceptance and a rejection; and program instructions, stored on at least one of the one or more storage devices for execution by at least one of the one or more processors, to adjust the heuristic algorithm based upon said result.

* * * * *